(12) United States Patent
Fujiwara

(10) Patent No.: US 8,397,337 B2
(45) Date of Patent: Mar. 19, 2013

(54) OPTICAL CONNECTOR CLEANING TOOL

(75) Inventor: Kunihiko Fujiwara, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 13/248,819

(22) Filed: Sep. 29, 2011

(65) Prior Publication Data

US 2012/0017384 A1   Jan. 26, 2012

Related U.S. Application Data

(63) Continuation of application No. PCT/JP2011/050971, filed on Jan. 20, 2011.

(30) Foreign Application Priority Data

Mar. 5, 2010  (JP) ................................. 2010-049849
Mar. 5, 2010  (JP) ................................. 2010-049850

(51) Int. Cl.
   *A47L 25/00*   (2006.01)
(52) U.S. Cl. .................................. 15/210.1; 15/104.001
(58) Field of Classification Search ................... 15/97.1, 15/104.001, 104.002, 210.1
   See application file for complete search history.

(56) References Cited

U.S. PATENT DOCUMENTS

| | | |
|---|---|---|
| 6,758,605 B1 | 7/2004 | Villemaire et al. |
| 2004/0103491 A1 | 6/2004 | Fujiwara et al. |
| 2008/0034519 A1 | 2/2008 | Fujiwara |
| 2010/0043159 A1 | 2/2010 | Fujiwara |

FOREIGN PATENT DOCUMENTS

| | | |
|---|---|---|
| JP | 9-197182 A | 7/1997 |
| JP | 2002-90576 A | 3/2002 |
| JP | 2004-233378 A | 8/2004 |
| JP | 2008-242124 A | 10/2008 |
| JP | 2009-229843 A | 10/2009 |
| WO | 2008/108278 A1 | 9/2008 |
| WO | 2009/119437 A1 | 10/2009 |

*Primary Examiner* — Robert Scruggs
(74) *Attorney, Agent, or Firm* — Sughrue Mion, PLLC

(57) ABSTRACT

An optical connector cleaning tool according to the present invention includes a tool main body and an extension section that extends from the tool main body, wherein the tool main body includes a supply reel and a winding reel, which perform supply and take-up of the cleaning body, a housing body that houses the supply reel and the winding reel, and a biasing member that is located in the housing body and biases the housing body. The biasing member biases backward in the extending direction the housing body that is in a state where the housing body has relatively moved forward in the extending direction of the extension section, and a position in a front-and-back direction of the biasing member is close to the front compared to positions in a front-and-back direction of the supply reel and the winding reel.

16 Claims, 16 Drawing Sheets

OPTICAL CONNECTOR CLEANING TOOL

CROSS-REFERENCE TO RELATED APPLICATION

This is a Continuation Application of International Application No. PCT/JP2011/050971, filed on Jan. 20, 2011, which claims priority to Japanese Patent Application No. 2010-049849 filed on Mar. 5, 2010 and Japanese Patent Application No. 2010-049850 filed on Mar. 5, 2010. The contents of the aforementioned applications are incorporated herein by reference.

BACKGROUND OF THE INVENTION

1. Field of the Invention

The present invention relates to an optical connector cleaning tool that cleans a joining end face of an optical connector by a cleaning body such as a cloth.

2. Description of the Related Art

When performing butt joint of an optical connector to an optical fiber or the like, if contamination or foreign material is attached to a joining end face, it causes damage at the time of connection and disconnection, an increase in transmission loss, or the like. For this reason, it is necessary to clean the joining end face prior to the butt joint.

For cleaning of the joining end face of the optical connector, an optical connector cleaning tool which wipes away contamination or the like by bringing a cleaning body such as a cloth into contact with the joining end face is used.

As the optical connector cleaning tool, there is an optical connector cleaning tool of a system which wipes away contamination or the like by bringing the cleaning body into contact with the joining end face of the optical connector while moving the cleaning body (refer to Patent Document 1, for example).

Patent Documents

[Patent Document 1] PCT International Publication No. WO 2008/108278 Pamphlet

However, in conventional optical connector cleaning tools, since the length size thereof is large, in a case where a sufficient working space cannot be secured, it sometimes becomes difficult to perform work.

The present invention has been made in view of the above-mentioned circumstances and has an object to provide an optical connector cleaning tool in which a reduction particularly in length size is attained such that it is possible to easily perform cleaning work even in a case where a sufficient working space cannot be secured.

SUMMARY (1) An optical connector cleaning tool according to an embodiment of the present invention wipes away and cleans a joining end face of an optical connector by a cleaning body that is fed and moved. The optical connector cleaning tool includes a tool main body, and an extension section that extends from the tool main body. The tool main body includes a feeding mechanism that performs supply and take-up of the cleaning body, a housing body that houses the feeding mechanism, and a biasing member that is located in the housing body and biases the housing body. The extension section includes an extension tube body that extends from the housing body, and a head member that presses the cleaning body against the joining end face at a leading end of the extension tube body. The feeding mechanism includes a supply reel that supplies the cleaning body to the head member, a winding reel that takes up the cleaning body passed through the head member, and a supporting body that rotatably supports these reels. The housing body is relatively movable forward and backward in the extending direction with respect to the extension section and the feeding mechanism and includes a driving section that feeds and moves the cleaning body by rotationally driving the winding reel in a take-up direction by the forward movement. The biasing member biases backward in the extending direction the housing body that is in a state where the housing body has relatively moved forward in the extending direction of the extension section, and a position in a front-and-back direction of the biasing member is close to the front compared to positions in a front-and-back direction of the supply reel and the winding reel.

(2) In the optical connector cleaning tool described in the above (1), it is preferable that the biasing member bias backward the housing body that is in a state where the housing body has relatively moved forward in the extending direction, by taking a reaction force of the supporting body.

(3) In the optical connector cleaning tool described in the above (2), it is preferable that the housing body includes a case section and a pressing body that is located in the case section and positioned with respect to the case section, the pressing body has a pressing portion, with which one end portion of the biasing member comes into contact, and the biasing member biases the housing body by biasing backward the pressing portion by taking a reaction force of the supporting body.

(4) In the optical connector cleaning tool described in any of the above (1) to (3), it is preferable that a position in a width direction of the biasing member be different from a position in a width direction of the extension section.

(5) In the optical connector cleaning tool described in any of the above (1) to (4), it is preferable that two or more of the biasing members be provided, a position in a width direction perpendicular to the extending direction of at least one biasing member of these biasing members be close to one side in the width direction compared to the extension section, and a position in a width direction of at least one of the other biasing members be close to the other side in the width direction compared to the extension section.

(6) In the optical connector cleaning tool described in any of the above (1) to (5), it is preferable that a direction in which a central axis of the supply reel and a central axis of the winding reel are arranged to be a direction different from the extending direction.

(7) In the optical connector cleaning tool described in the above (6), it is preferable that a direction in which the central axis of the supply reel and the central axis of the winding reel are arranged to be perpendicular or approximately perpendicular to the extending direction.

(8) In the optical connector cleaning tool described in the above (6) or (7), it is preferable that any one of the supply reel and the winding reel be located at a rear in the extending direction of the extension section.

(9) In the optical connector cleaning tool described in the above (6) or (7), it is preferable that a position in a width direction perpendicular to the extending direction of the supply reel to be close to one side in the width direction compared to the extension section, and a position in a width direction of the winding reel to be close to the other side in the width direction compared to the extension section.

(10) An optical connector cleaning tool according to another embodiment of the present invention wipes away and cleans a joining end face of an optical connector by a cleaning body that is fed and moved. The optical connector cleaning tool includes a tool main body, and an extension section that extends from the tool main body. The tool main body includes a feeding mechanism that performs supply and take-up of the cleaning body, and a housing body that houses the feeding mechanism. The extension section includes an extension tube body that extends from the housing body, and a head member that presses the cleaning body against the joining end face at a leading end of the extension tube body. The feeding mechanism includes a supply reel that supplies the cleaning body to the head member, a winding reel that takes up the cleaning body passed through the head member, and a supporting body that rotatably supports these reels. The housing body is relatively movable forward and backward in an extending direction of the extension section with respect to the extension section and the feeding mechanism and includes a driving section that feeds and moves the cleaning body by rotationally driving the winding reel in a take-up direction by the forward movement. A direction in which a central axis of the supply reel and a central axis of the winding reel are arranged is a direction different from the extending direction.

(11) In the optical connector cleaning tool described in the above (10), it is preferable that a direction in which the central axis of the supply reel and the central axis of the winding reel are arranged be perpendicular or approximately perpendicular to the extending direction.

(12) In the optical connector cleaning tool described in the above (10) or (11), it is preferable that any one of the supply reel and the winding reel be located at a rear in the extending direction of the extension section.

(13) In the optical connector cleaning tool described in the above (10) or (11), it is preferable that a position in a width direction perpendicular to the extending direction of the supply reel be close to one side in the width direction compared to the extension section, and a position in the width direction of the winding reel be close to the other side in the width direction compared to the extension section.

In the optical connector cleaning tool described in the above (1), the position in the front-and-back direction of the biasing member is closer to the front than the positions in the front-and-back direction of the supply reel and the winding reel. For this reason, it is not necessary to secure a space for the biasing member behind the feeding mechanism, so that the length size of the cleaning tool can be reduced.

Accordingly, it is possible to easily perform cleaning work even in a case where a sufficient working space cannot be secured.

In the optical connector cleaning tool described in the above (10), a direction in which the central axis of the supply reel and the central axis of the winding reel are arranged is a direction different from the extending direction of the extension section. Therefore, a space in the front-and-back direction in the housing body for housing the supply reel and the winding reel can be reduced. For this reason, the length size of the cleaning tool can be reduced.

Accordingly, it is possible to easily perform cleaning work even in a case where a sufficient working space cannot be secured.

DETAILED DESCRIPTION OF THE PREFERRED EMBODIMENTS

Hereinafter, an optical connector cleaning tool (hereinafter also simply referred to as a "cleaning tool") 1 according to a first embodiment of the present invention will be described with reference to the drawings.

As shown in FIGS. 1 to 4, the cleaning tool 1 includes a tool main body 10 and an extension section 20 that extends from the tool main body 10.

Figure 1:
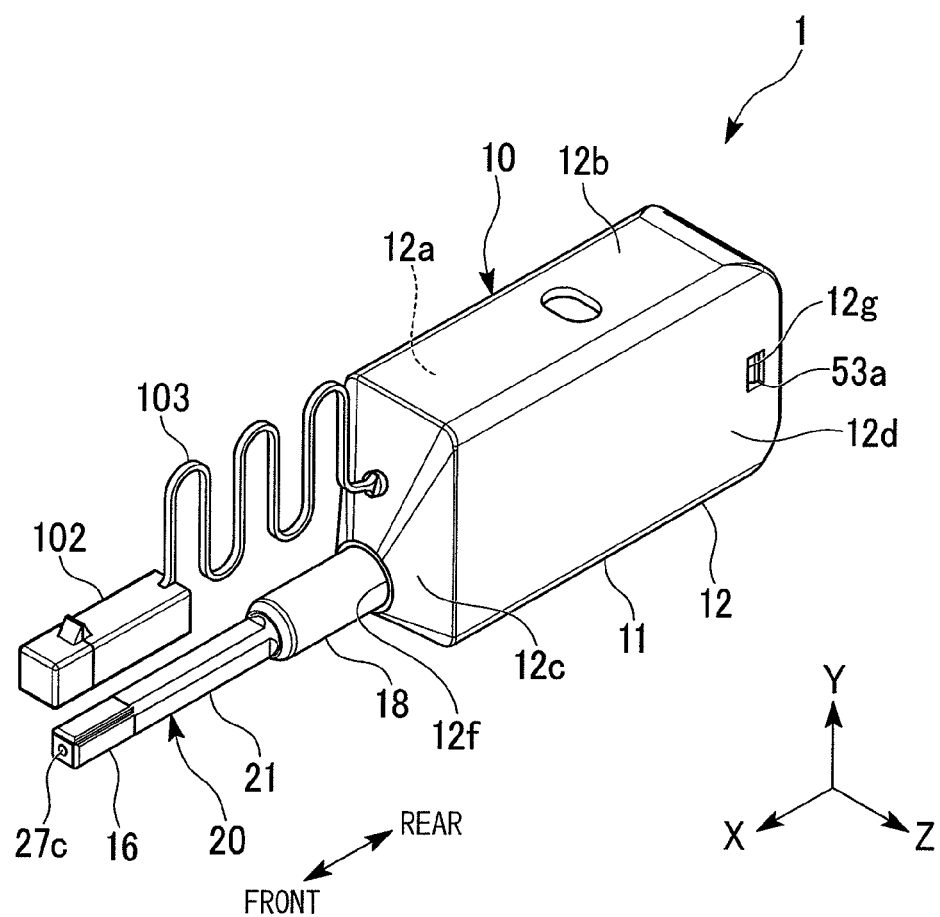
FIG. 1 is a perspective view of an optical connector cleaning tool according to a first embodiment of the present invention.

In the following explanation, the leading end direction of the extension section 20 (an extension tube body 21) shown in FIG. 1 is sometimes referred to as the front in an extending direction or simply referred to as the front and the opposite direction is sometimes referred to as the rear.

Also, an XYZ orthogonal coordinate system shown in FIG. 1 is set and a positional relationship between the respective members is sometimes described referring to the coordinate system. The X direction is a direction (the front-and-back direction in FIG. 1) which follows the extension section 20, the Y direction is a width direction (the width direction of the cleaning tool 1) perpendicular to the X direction, and the Z direction is a direction perpendicular to the X direction and the Y direction. The X direction and the Y direction are directions parallel to a basal plate portion 12a of a housing body 11 shown in FIGS. 1 and 3.

As shown in FIGS. 1 to 4, the tool main body 10 includes a feeding mechanism 3 which performs supply and take-up (winding) of a cleaning body 2, a rotating mechanism 5 which rotates a head member 23, the housing body 11 which houses these mechanisms, and a biasing member 40 which is located in housing body 11 and biases the housing body 11.

The housing body 11 includes a case section 12 that is an approximately rectangular parallelepiped, and a pressing body 13 which is located in the case section 12 and positioned with respect to the case section 12.

The case section 12 has a first basal plate portion 12a, side plate portions 12b and 12b formed at the side edges of the first basal plate portion 12a, a front plate portion 12c provided at the front edge of the first basal plate portion 12a, and a second basal plate portion 12d provided parallel to the first basal plate portion 12a with a housing space 12e (refer to FIG. 4) interposed therebetween.

In the front plate portion 12c, an insertion opening 12f, through which the extension tube body 21 passes, is formed.

Figure 5:
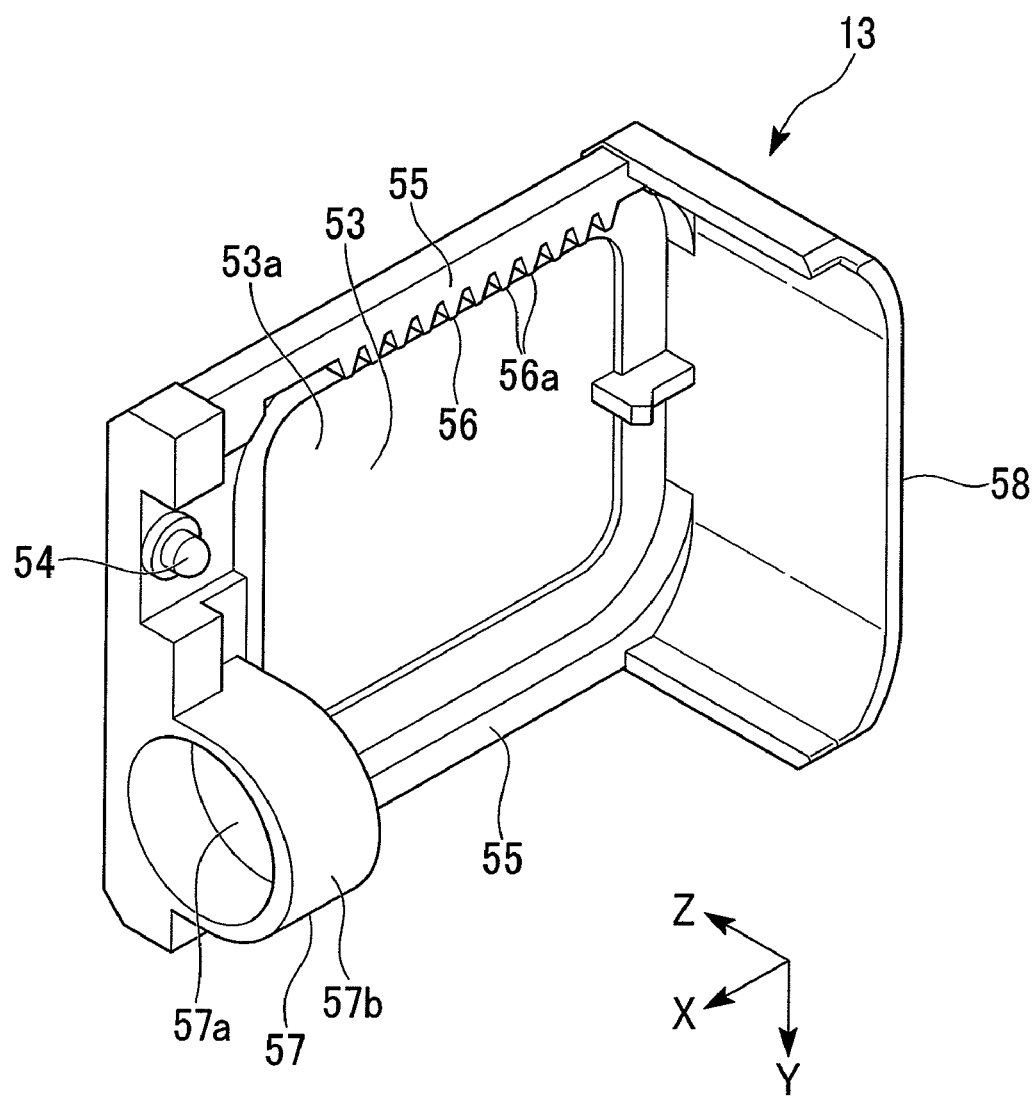
FIG. 5 is a perspective view showing a pressing body.

As shown in FIG. 5, the pressing body 13 includes a basal plate 53, an insertion protrusion portion 54 formed to protrude in the thickness direction of the basal plate 53 from a front end portion of the basal plate 53 (from an inner surface 53a of the basal plate 53), projection portions 55 formed to protrude in the thickness direction of the basal plate 53 from both side edge portions of the basal plate 53, a pressing portion 57 formed at the front end portion of the basal plate 53, and a rear end plate 58 formed to extend in the thickness direction of the basal plate 53 from a rear end portion of the basal plate 53. A serrated gear receiving portion 56 (a driving section) is formed at the projection portion 55 on one side among the projection portions 55 of both side edge portions of the basal plate 53.

The gear receiving portion 56 is a driving section which rotationally drives a winding reel 31 in a take-up direction by forward movement of the pressing body 13 with respect to the feeding mechanism 3. The gear receiving portion 56 is composed of a plurality of receiving tooth portions 56a formed to protrude toward the projection portion 55 on the other side. The receiving tooth portions 56a are arranged in the front-and-back direction (the X direction).

In addition, although in an example of this embodiment, the serrated gear receiving portion 56 is adopted, a configuration for driving the winding reel 31 is not limited thereto. With respect to the gear receiving portion 56, it is acceptable if it is a configuration capable of applying a force in a rotation direction to the winding reel 31 and other configurations such as a configuration of applying a force in a rotation direction to the winding reel 31 by frictional contact with the outer circumferential edge of the winding reel 31, for example, may be adopted.

The insertion protrusion portion 54 is an approximately cylindrical shape and formed to protrude in the thickness direction of the basal plate 53 from the front end portion of the basal plate 53. The protrusion height and the outer diameter of the insertion protrusion portion 54 are set such that the insertion protrusion portion 54 can be fitted into a cam groove 85 of a rotating tube portion 82.

The pressing portion 57 has a pressing plate 57a which presses the biasing member 40, and a cylindrical holding tube portion 57b formed at the periphery of the pressing plate 57a.

The pressing plate 57a is formed to protrude in the thickness direction of the basal plate 53 from the front end portion of the basal plate 53. The pressing plate 57a can be formed perpendicular to the front-and-back direction (the X direction).

The holding tube portion 57b is for regulating positional deviation of the biasing member 40 and is formed to be able to receive a rear end portion of the biasing member 40.

Figure 2:
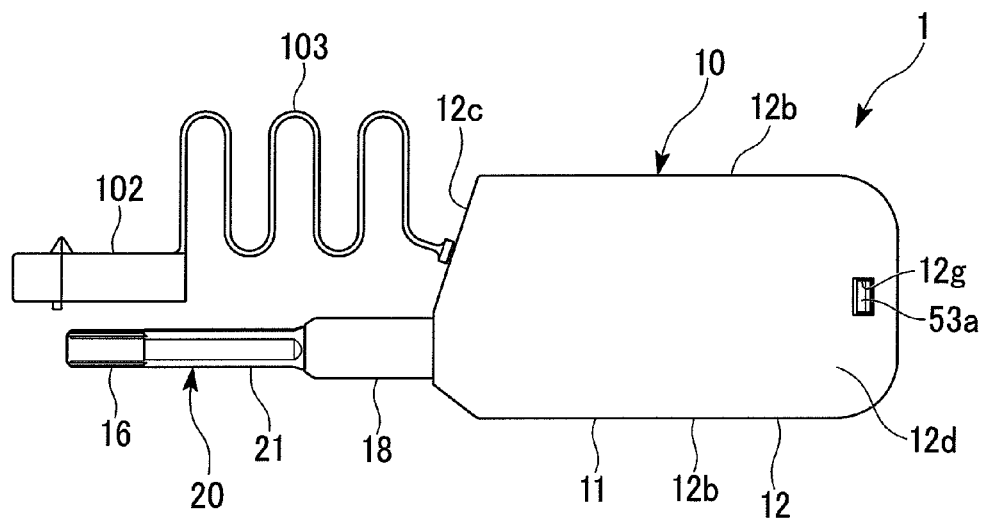
FIG. 2 is a front view of the optical connector cleaning tool.
Figure 3:
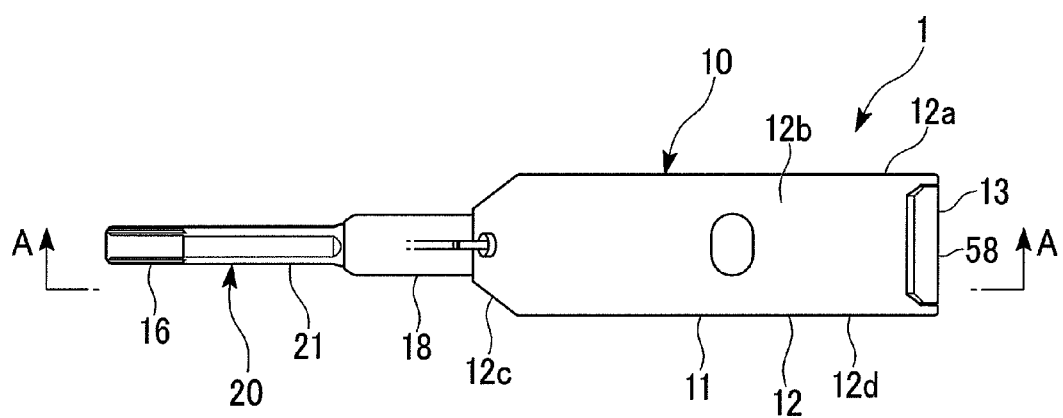
FIG. 3 is a plan view of the optical connector cleaning tool.

As shown in FIGS. 1 and 2, a locking protrusion 53a which is locked to a locking hole 12g of the second basal plate portion 12d is formed on the outer surface of the basal plate 53 of the pressing body 13.

The pressing body 13 is positioned with respect to the case section 12 by locking of the locking protrusion 53a to the locking hole 12g and made so as to move along with the case section 12.

Figure 8:
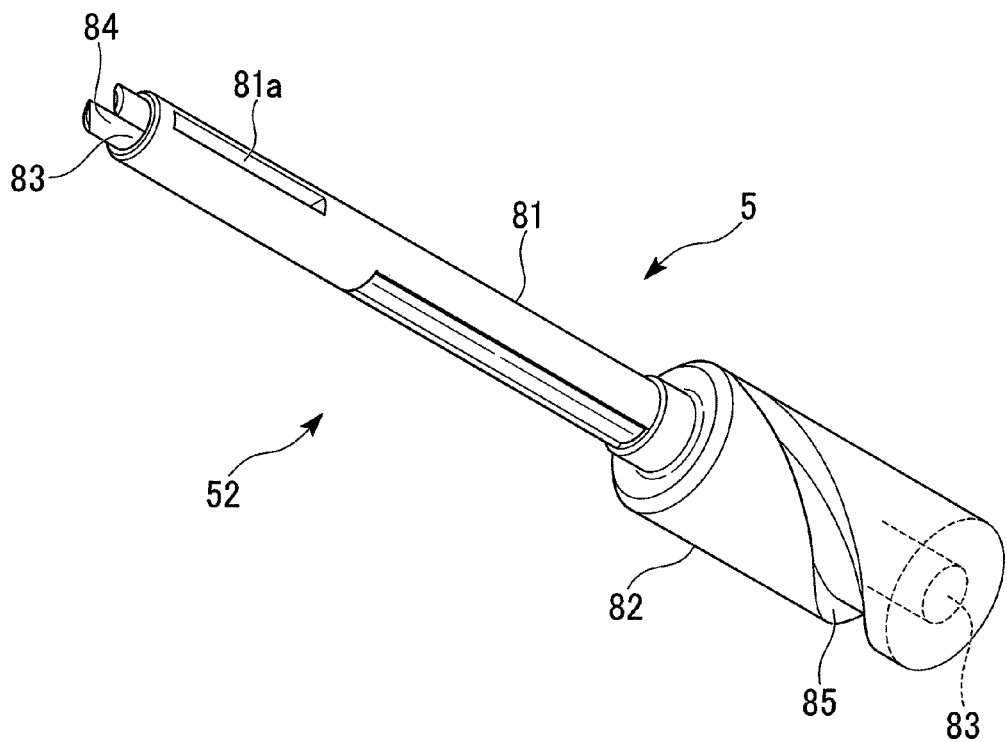
FIG. 8 is a perspective view showing a rotating shaft.

As shown in FIG. 8, the rotating mechanism 5 includes a rotating shaft 52 rotatable around the axis thereof.

The rotating shaft 52 has the rotating tube portion 82 and a guide tube portion 81 which extends forward from a front end of the rotating tube portion 82.

In the rotating shaft 52, an insertion hole 83, through which the cleaning body 2 passes, is formed over an area from a front end of the guide tube portion 81 to a rear end of the rotating tube portion 82.

Figure 7:
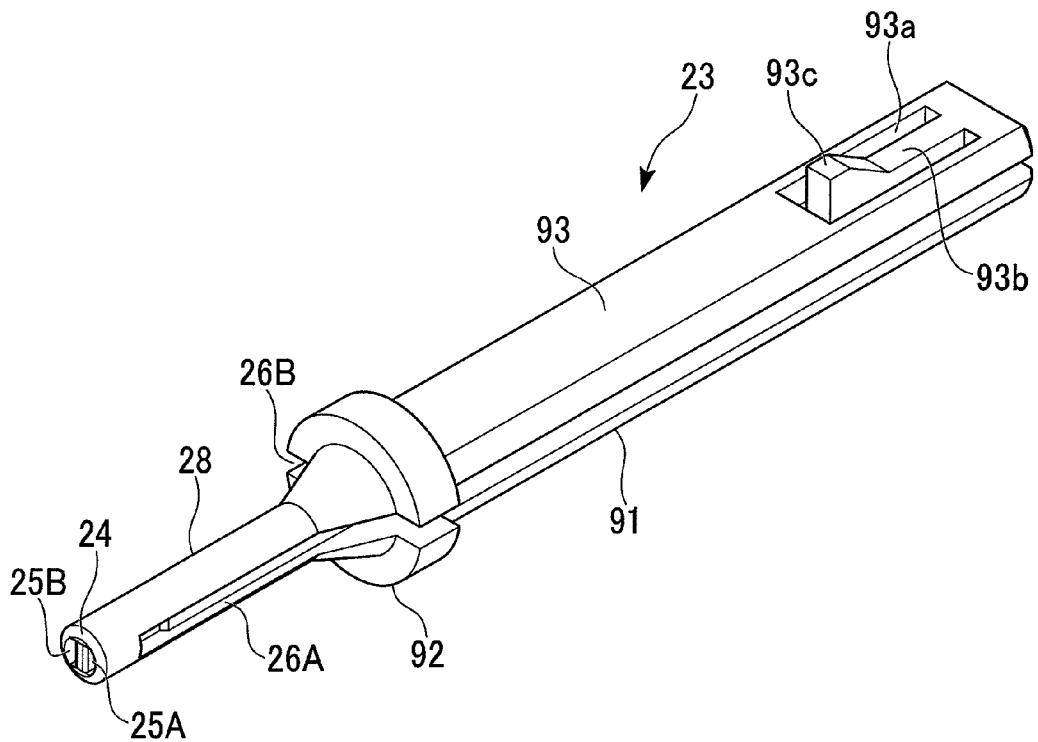
FIG. 7 is a perspective view showing a head member.

The guide tube portion 81 is formed into an approximately cylindrical shape and at a front end portion thereof, an insertion portion 91 of the head member 23 is inserted into the insertion hole 83 (refer to FIG. 7). The inner surface of the front end portion of the guide tube portion 81 is made of a rotation stopping portion 84 formed in a flat shape.

The rotating tube portion 82 is formed into an approximately cylindrical shape and in the outer surface thereof, the cam groove 85, into which the insertion protrusion portion 54 of the pressing body 13 is inserted, is formed.

The cam groove 85 is formed such that at least a portion is inclined with respect to the axial direction of the rotating tube portion 82. For this reason, as will be described later, if the insertion protrusion portion 54 inserted into the cam groove 85 moves in the front and back direction, the rotating tube portion 82 moves along the cam groove 85, whereby the rotating shaft 52 rotates around the axis thereof. In the illustrated example, the cam groove 85 is formed in a helical shape.

Figure 9:
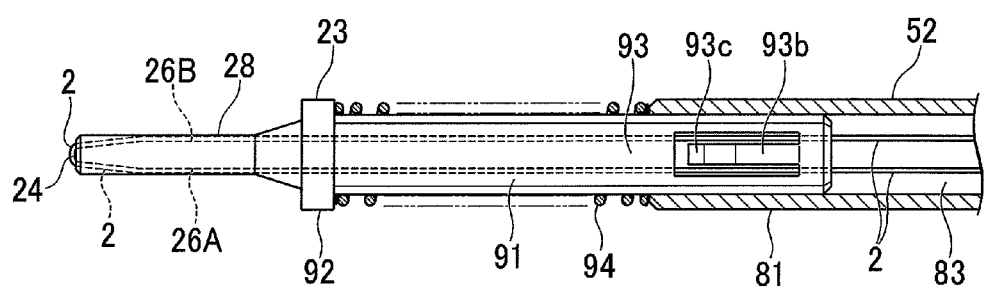
FIG. 9 is a plan view in a partially cross-sectional state showing the rotating shaft and the head member mounted on a leading end of the rotating shaft.

As shown in FIGS. 7 and 9, the head member 23 is provided with the insertion portion 91 capable of being inserted into the insertion hole 83 of the guide tube portion 81, a flange portion 92 formed at a front end of the insertion portion 91, and an approximately cylindrical leading end extension portion 28 which extends forward from the front face of the flange portion 92.

Figure 20:
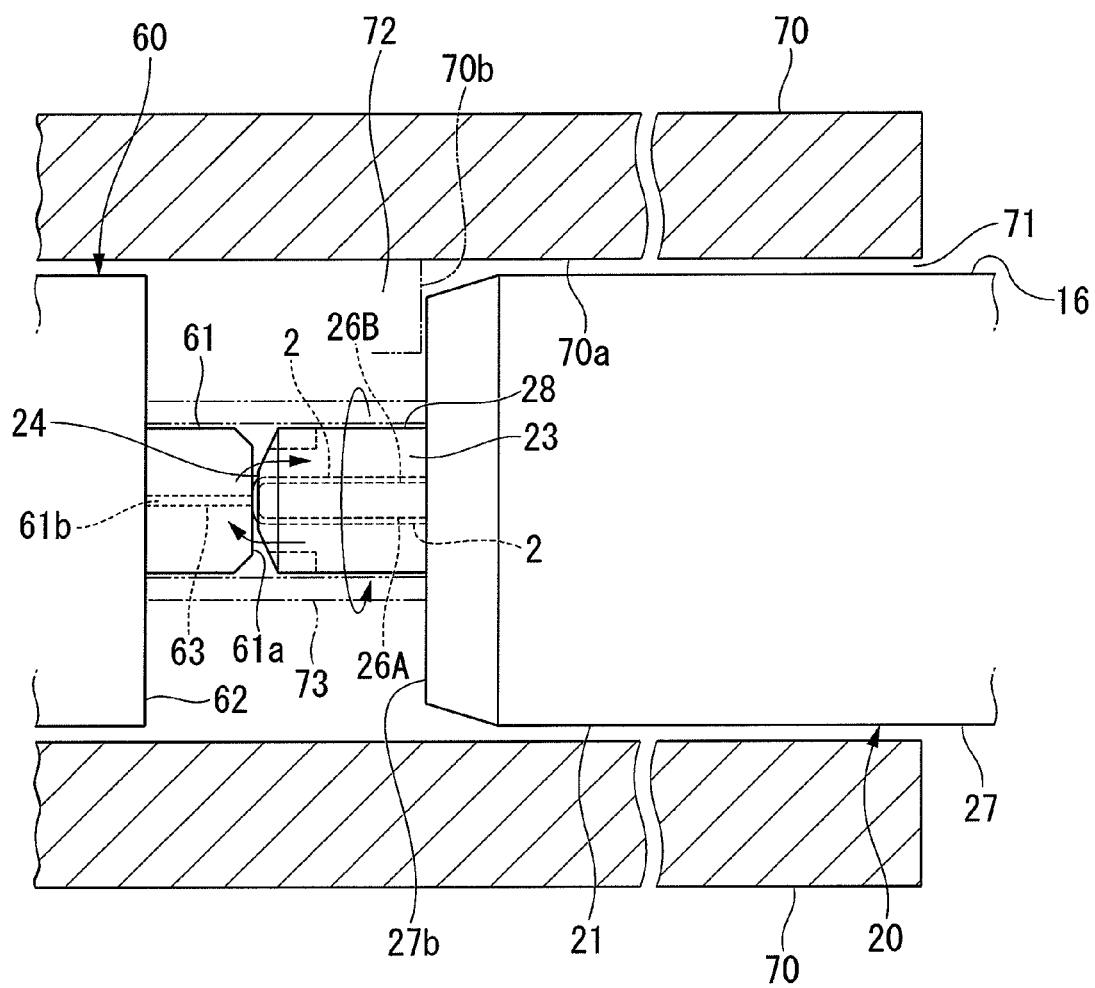
FIG. 20 is a process diagram showing a method of using the optical connector cleaning tool.
Figure 21:
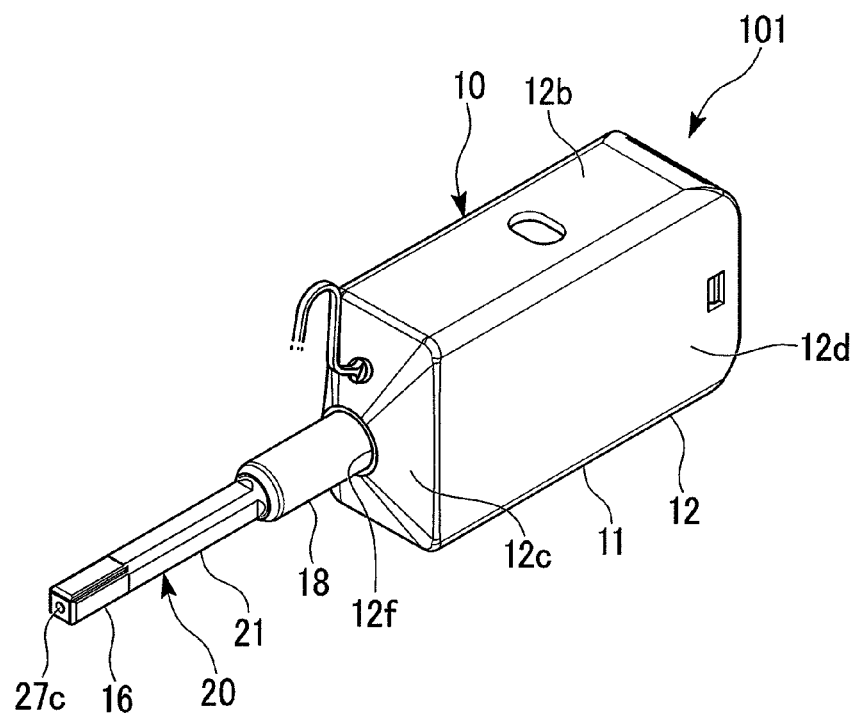
FIG. 21 is a perspective view of an optical connector cleaning tool according to a second embodiment of the present invention.
Figure 22:
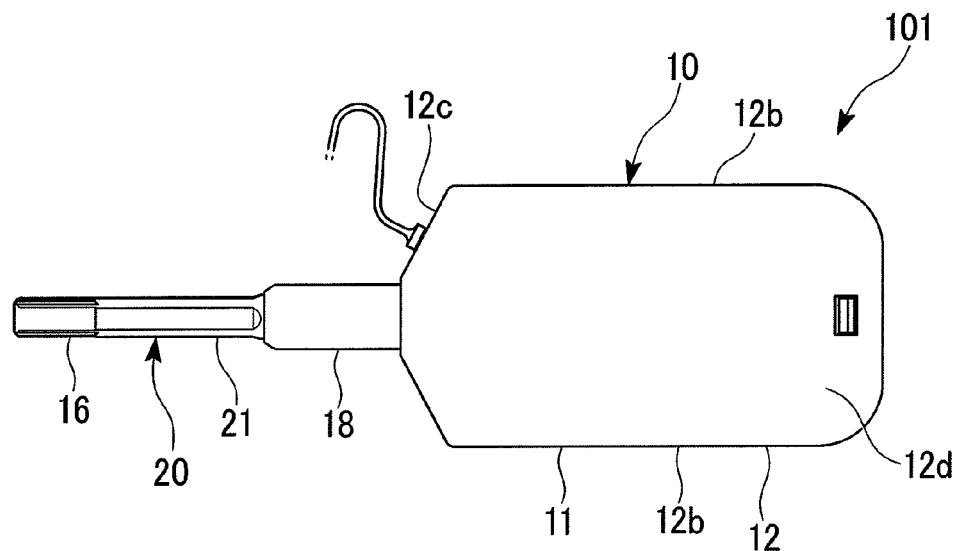
FIG. 22 is a front view of the optical connector cleaning tool.

The leading end face of the leading end extension portion 28 becomes a pressing face 24 which presses the cleaning body 2 against a joining end face 61a (refer to FIG. 20).

In the pressing face 24, guide opening portions 25A and 25B (guide portions) that are opening portions, through which the cleaning body 2 passes, are formed.

The guide opening portion 25A on one side is for leading the cleaning body 2 from the feeding mechanism 3 to the pressing face 24, and the guide opening portion 25B on the other side is for leading the cleaning body 2 passed through the pressing face 24 to the feeding mechanism 3. Deviation of the cleaning body 2 from the pressing face 24 can be prevented by the guide opening portions 25A and 25B.

In the side face of the leading end extension portion 28, it is preferable to form guide grooves 26A and 26B which guide feeding movement of the cleaning body 2. The guide grooves 26A and 26B are also formed in the side faces of the flange portion 92 and the insertion portion 91.

At the insertion portion 91, a flat portion 93 of a shape that is adapted to the rotation stopping portion 84 formed at the guide tube portion 81 is formed, and the flat portion 93 is disposed along the rotation stopping portion 84. For this reason, the head member 23 does not rotate with respect to the guide tube portion 81. In the illustrated example, the flat portions 93 are formed on the faces on one side and the other side of the insertion portion 91.

An opening portion 93a is formed in a rear portion of the flat portion 93 on one side of the insertion portion 91. An elastic piece 93b extending forward is formed at the rear edge of the opening portion 93a. An engagement claw 93c that protrudes with respect to the flat portion 93 is formed at a leading end of the elastic piece 93b.

Figure 10:
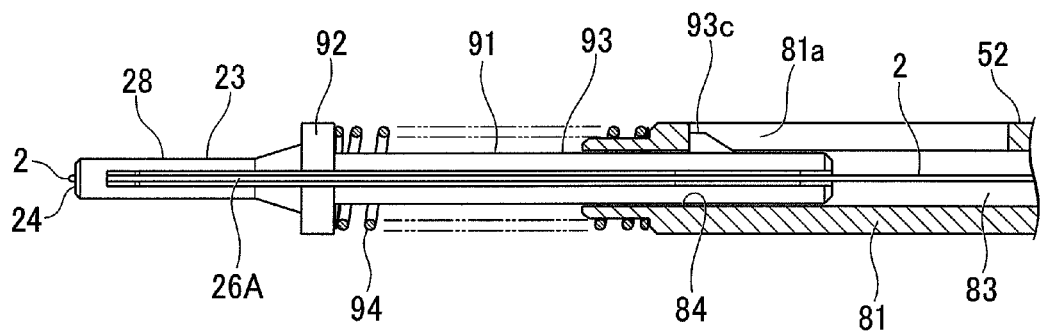
FIG. 10 is a side view in a partially cross-sectional state showing the rotating shaft and the head member mounted on the leading end of the rotating shaft.

As shown in FIG. 10, the engagement claw 93c can be locked to the front edge of an engagement opening portion 81a (an engagement concave portion) formed in the guide tube portion 81, and by locking of the engagement claw 93c to the front edge of the engagement opening portion 81a, forward movement of the head member 23 is regulated, so that falling-off of the head member 23 can be prevented.

Figure 11:
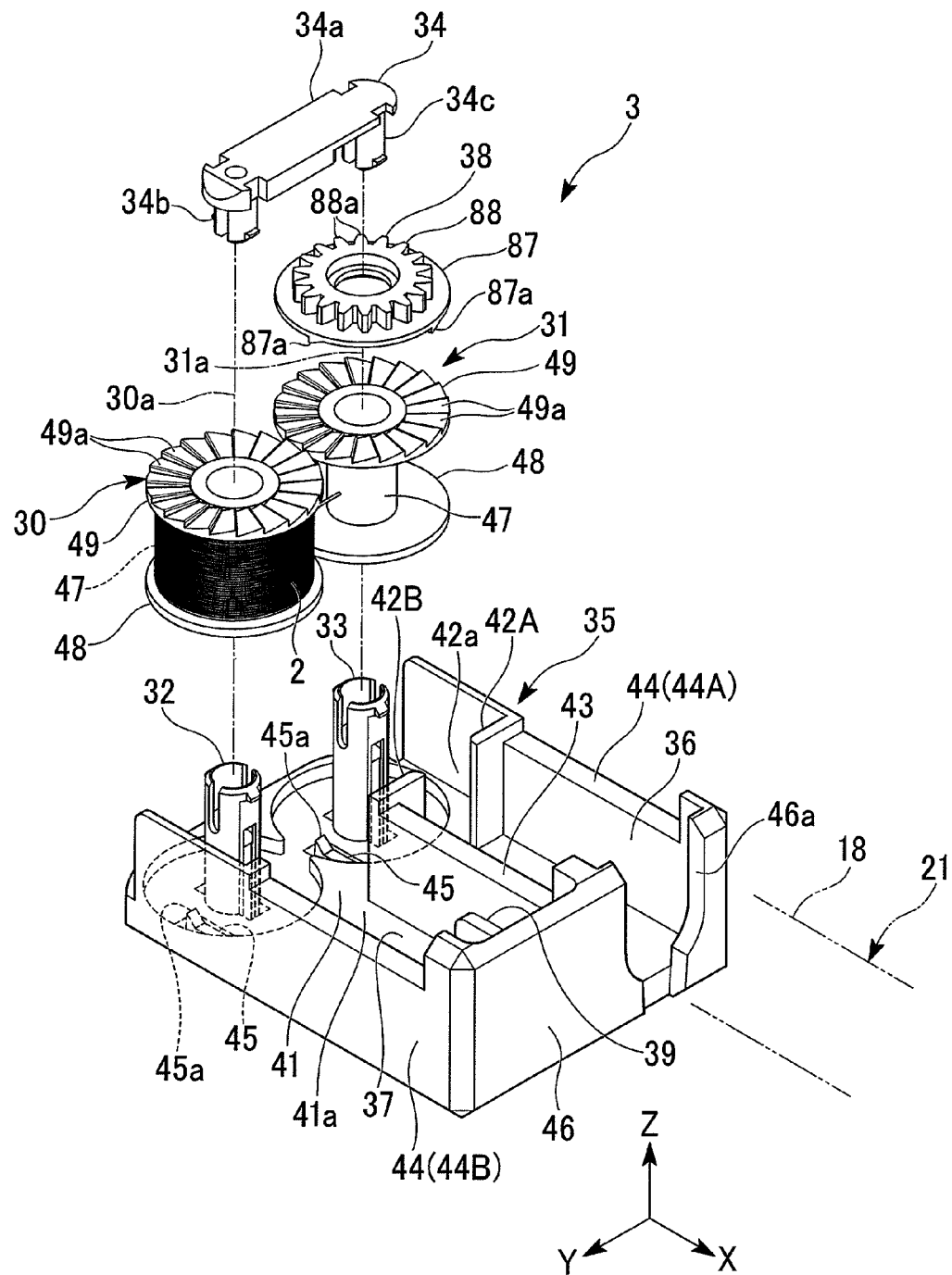
FIG. 11 is an exploded perspective view showing a feeding mechanism.

As shown in FIGS. 9 to 11, the cleaning body 2 drawn from a supply reel 30 is wound on the head member 23.

In the illustrated example, the cleaning body 2 passes the insertion hole 83 of the rotating shaft 52 from the supply reel 30 and then reaches the pressing face 24 through the guide groove 26A and the guide opening portion 25A of the head member 23. Then, the cleaning body 2 passes the guide opening portion 25B and the guide groove 26B from the pressing face 24 and then reaches the winding reel 31 through the insides of the guide tube portion 81 and the insertion hole 83.

The cleaning body 2 is not particularly limited and one made by processing a known suitable cleaning cloth (non-woven fabric or woven fabric) into a thread form (or a string form), a tape form, or the like can be adopted. As the cleaning body 2, for example, one composed of ultrafine fibers such as polyester or nylon can be exemplified.

A reference numeral 94 in FIGS. 9 and 10 denotes a biasing member (for example, a spring member such as a coil spring) provided between the front end of the guide tube portion 81 and the flange portion 92. The biasing member 94 biases forward the head member 23 when the head member 23 has been pressed against the joining end face 61a.

As shown in FIG. 11, the feeding mechanism 3 includes the supply reel 30 (a supply device) on which the cleaning body 2 is wound, the winding reel 31 (a take-up device) which takes up and collects the cleaning body 2 after use, a supporting body 35 which rotatably supports the reels, a gear 38 which is mounted on the winding reel 31, and a pressing section 34.

The supporting body 35 includes a basal plate 41, a supply reel support shaft 32 which is provided on an inner surface 41a of the basal plate 41 to rotatably support the supply reel 30, a winding reel support shaft 33 which is provided on the inner surface 41a of the basal plate 41 to rotatably support the winding reel 31, side plates 44 (44A and 44B) formed at both side edge portions of the basal plate 41, a partition plate 43 provided between both side plates 44 (44A and 44B), and a front end plate 46 formed at a front end portion of the basal plate 41.

The side plates 44 (44A and 44B) are formed along the extending direction (the X direction) of the extension section 20.

The partition plate 43 is formed approximately parallel to the side plates 44 (44A and 44B) at an intermediate position between both side plates 44 (44A and 44B) and partitions a space between both side plates 44 (44A and 44B) into a tube body base housing portion 36 and a biasing member housing portion 37.

The tube body base housing portion 36 is a space between the side plate 44A on one side and the partition plate 43 and can house a tube body base 15 of the extension tube body 21.

At the side plate 44A, a regulation plate 42A which regulates backward movement of the tube body base 15 is formed facing the partition plate 43, and also at a rear end portion of the partition plate 43, a regulation plate 42B which regulates backward movement of the tube body base 15 is formed facing the side plate 44A. An area between the regulation plates 42A and 42B becomes a passage portion 42a through which the cleaning body 2 passes.

A reference numeral 46a in FIG. 11 denotes a concave portion formed in the front end plate 46 and the concave portion 46a is formed such that the extension tube body 21 (an outer tube body 18) can pass therethrough.

The tube body base housing portion 36 regulates backward movement of the tube body base 15 by the regulation plates 42A and 42B and also regulates forward movement of the tube body base 15 by the front end plate 46.

The biasing member housing portion 37 is a space between the side plate 44B on the other side and the partition plate 43 and can house the biasing member 40.

Figure 4:
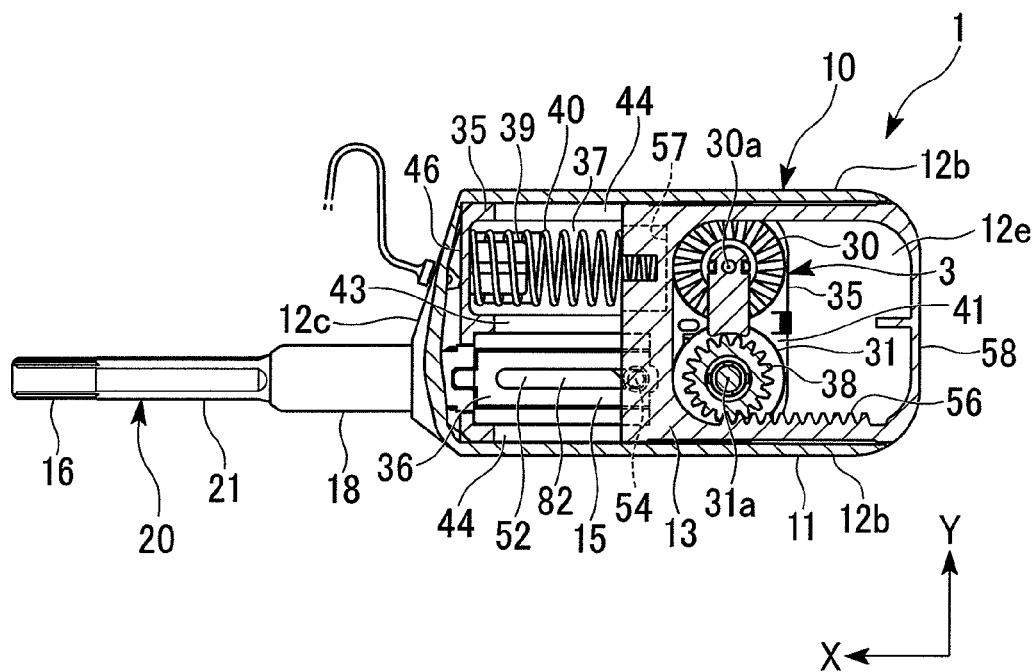
FIG. 4 is a cross-sectional view taken along line A-A of FIG. 3 and viewed from the direction of an arrow.

On the rear surface of the front end plate 46, a holding protrusion 39 which is inserted into a front end portion of the biasing member 40 in the biasing member housing portion 37 to position the biasing member 40 is formed to protrude backward (refer to FIG. 4).

The positions of the support shafts 32 and 33 can be designed such that the installation positions (positions in the front-and-back direction) of the supply reel 30 and the winding reel 31 are close to the rear compared to the installation position of the tube body base 15 in the tube body base housing portion 36.

The positions of the support shafts 32 and 33 are designed such that the installation positions (positions in the front-and-back direction) of the supply reel 30 and the winding reel 31 are close to the rear compared to the installation position of the biasing member 40 in the biasing member housing portion 37.

In the illustrated example, the positions in the front-and-back direction of the supply reel 30 and the winding reel 31 are close to the rear compared to the installation position of the pressing portion 57 of the pressing body 13 (refer to FIG. 4).

For this reason, the installation position of the biasing member 40 is close to the front compared to the installation positions of the supply reel 30 and the winding reel 31.

Accordingly, it is not necessary to secure a space for the biasing member 40 behind the feeding mechanism 3, so that the size of the cleaning tool 1 in the front-and-back direction can be reduced.

Alternatively, the positions of the support shafts 32 and 33 may be designed such that a direction in which a central axis 30a of the supply reel 30 and a central axis 31a of the winding reel 31 are arranged is different from the front-and-back direction (the X direction).

In an example shown in FIGS. 4 and 11, a direction in which the central axes 30a and 31a are arranged is set to be the width direction (the Y direction) perpendicular (or approximately perpendicular) to the front-and-back direction (the X direction).

In the illustrated example, since a direction in which the central axes 30a and 31a are arranged is perpendicular to the front-and-back direction (the X direction), there is an advantage that a space in the front-and-back direction needed by the supply reel 30 and the winding reel 31 can be minimized. Accordingly, the size of the cleaning tool 1 in the front-and-back direction can be reduced.

In addition, a direction in which the central axes 30a and 31a are arranged is not limited to the illustrated example, provided that it is a direction different from the X direction. For example, the angle that a direction in which the central axes 30a and 31a are arranged makes with the X direction may be over 0° and less than 90°.

It is more preferable that as in this embodiment, the installation position of the biasing member 40 be set to be close to the front compared to the installation positions of the supply reel 30 and the winding reel 31 and also the positions of the support shafts 32 and 33 be designed such that a direction in which the central axis 30a of the supply reel 30 and the central axis 31a of the winding reel 31 are arranged is different from the front-and-back direction (the X direction). The size of the cleaning tool 1 in the front-and-back direction can be reduced further than the case of design of one of the above configurations, so that it becomes possible to easily perform cleaning work even in a case where a sufficient working space cannot be secured.

The positions of the support shafts 32 and 33 can be set such that the position in the width direction (the Y direction) of any one of the supply reel 30 and the winding reel 31 approximately corresponds with the position in the width direction of the extension section 20. That is, any one of the supply reel 30 and the winding reel 31 is located behind the extension section 20.

As shown in FIG. 4, in an example of this embodiment, the position in the width direction of the central axis 31a of the winding reel 31 approximately corresponds with the position in the width direction of the central axis line of the extension tube body 21. By this configuration, it is possible to smoothly wind the cleaning body 2 led out of the insertion hole 83 of the rotating tube portion 82 in the tube body base 15.

Although it is not shown, a configuration is also possible in which the position in the width direction of the central axis 30a of the supply reel 30 approximately corresponds with the position in the width direction of the central axis line of the extension tube body 21. In this case, the cleaning body 2 can be smoothly supplied into the insertion hole 83 of the rotating tube portion 82.

In addition, the position in the width direction of the central axis of the supply reel 30 or the winding reel 31 does not have to correspond with the position in the width direction of the central axis line of the extension section 20, and if the central axis of the supply reel 30 or the winding reel 31 is at any position behind the extension section 20, supply or winding of the cleaning body 2 can be smoothly performed to the minimum necessary.

At the basal plate 41, two extension plates 45 and 45 that extend perpendicularly to the diameter directions of the reels 30 and 31 are formed. At the leading ends of these extension plates 45 and 45, locking claws 45a and 45a that respectively protrude toward the reels 30 and 31 are formed. The extension plates 45 can perform elastic bending deformation. The locking claws 45a can move in a direction in which each locking claw 45a approaches and is separated from each of the reels 30 and 31.

The pressing section 34 is for preventing falling-off of the reels 30 and 31 and the gear 38. The pressing section 34 has a long plate-like main body portion 34a extending in the width direction (the Y direction) and fitting portions 34b and 34c which are formed at a front end and a rear end of the main body portion 34a and can be fitted into the reel support shafts 32 and 33.

Each of the supply reel 30 and the winding reel 31 has a barrel portion 47, around which the cleaning body 2 is wrapped, a first end plate 48 provided at one end of the barrel portion 47, and a second end plate 49 provided at the other end of the barrel portion 47.

In the outer surface of the first end plate 48, a plurality of locking concave portions (not shown) arranged along a circumferential direction is formed. The locking claws 45a of the extension plates 45 are engaged with the locking concave portions, whereby rotation in a reverse direction of the reels 30 and 31 is prevented. On the outer surface of the second end plate 49, a plurality of locking convex portions 49a arranged along a circumferential direction is formed.

The reels 30 and 31 are rotatably mounted on the supporting body 35 by inserting each of the support shafts 32 and 33 into each barrel portion 47.

The gear 38 has a disc-shaped basal plate 87 and a toothed wheel portion 88 formed on the surface on one side of the disc-shaped basal plate 87. On the surface on the other side of the disc-shaped basal plate 87, locking protrusions 87a which are locked to the locking convex portions 49a of the winding reel 31 are formed.

The toothed wheel portion 88 has a plurality of tooth portions 88a arranged along the circumferential direction thereof. These tooth portions 88a are formed so as to be engaged with the receiving tooth portions 56a of the gear receiving portion 56 of the pressing body 13.

The gear 38 is installed to be superposed on the second end plate 49 of the winding reel 31. Since the locking protrusions 87a of the disc-shaped basal plate 87 are locked to the locking convex portions 49a of the second end plate 49, the winding reel 31 also rotates in accordance with rotation of the gear 38.

The locking protrusions 87a are formed in such a manner that in a case where the gear 38 rotates in the opposite direction to a winding direction, the locking protrusions 87a are not locked to the locking convex portions 49a.

As shown in FIGS. 4 and 11, the biasing member 40 biases backward the housing body 11 which is in a state where the housing body 11 has relatively moved forward. As the biasing member 40, a spring member such as a coil spring is suitable.

The biasing member 40 biases backward the housing body 11 by taking a reaction force of the supporting body 35. Specifically, the biasing member 40 biases backward the pressing portion 57 of the pressing body 13 by taking a reaction force of the front end plate 46.

Figure 6:
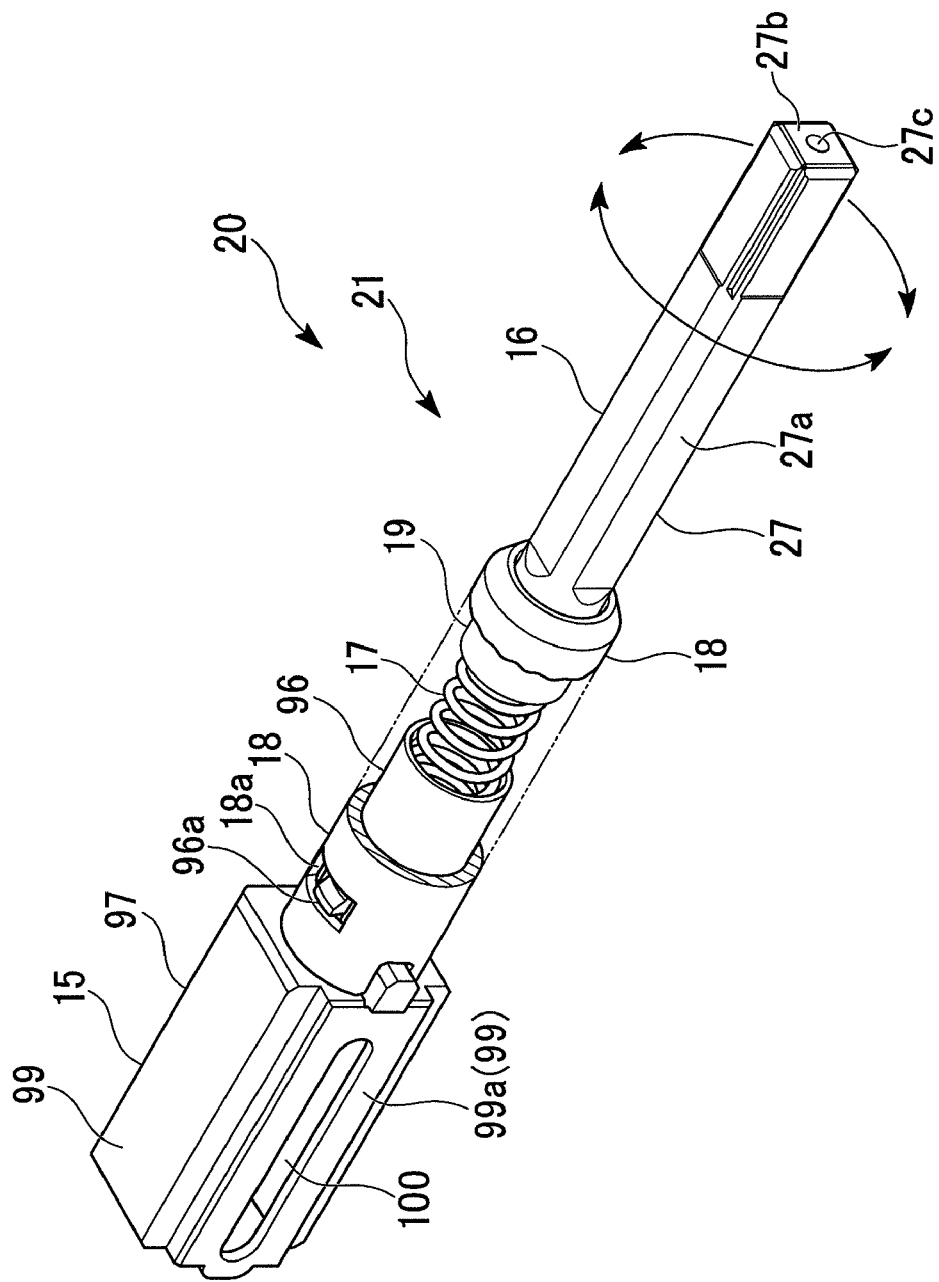
FIG. 6 is a perspective view showing an extension tube body.
Figure 16:
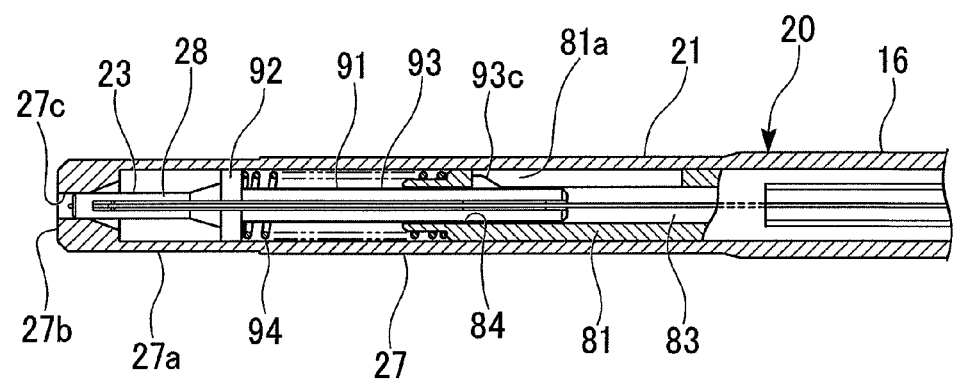
FIG. 16 is a process diagram showing an operation of the head member.

As shown in FIGS. 6, 7, and 16, the extension section 20 includes the extension tube body 21 and the head member 23 which is inserted into the extension tube body 21.

The extension tube body 21 includes the tube body base 15, a leading end tube section 16 provided at the leading end side of the tube body base 15, a biasing member 17 which biases forward the leading end tube section 16, and the outer tube body 18.

The tube body base 15 includes a holding frame portion 97 and a cylindrical connection tube portion 96 which extends forward from a front end of the holding frame portion 97.

The holding frame portion 97 is formed into a tube shape having a rectangular cross section and can house the rotating tube portion 82 of the rotating shaft 52 in the inside thereof.

In a side plate 99a that is one of four side plates 99 constituting the holding frame portion 97, a slit 100, into which the insertion protrusion portion 54 of the pressing body 13 is inserted, is formed along the front-and-back direction.

The connection tube portion 96 is made to be an approximately cylindrical shape into which the guide tube portion 81 of the rotating shaft 52 can be inserted.

On the outer surface of the connection tube portion 96, a fitting claw 96a which is fitted into a locking opening portion 18a formed in the outer tube body 18 is formed.

On the inner surface of the connection tube portion 96, a step portion (not shown), with which a rear end of the biasing member 17 comes into contact, is formed.

As shown in FIGS. 6 and 16, the leading end tube section 16 is composed of a cylindrical large diameter portion 19 and a fine diameter portion 27 which extends forward from a front end of the large diameter portion 19.

The fine diameter portion 27 has a tubular wall portion 27a and a leading end wall portion 27b provided at a front end of the tubular wall portion 27a. In the illustrated example, the fine diameter portion 27 is a tubular body having a cover in which the tubular wall portion 27a having an approximately rectangular cross section extends backward from the peripheral edge of the approximately rectangular plate-like leading end wall portion 27b.

A leading end portion of the tubular wall portion 27a has a cross-sectional shape corresponding to a connector receiving hole 72 (refer to FIG. 20) of an optical adapter 70 which becomes a target of cleaning.

In addition, the cross-sectional shape of the tubular wall portion 27a is not limited to a rectangular shape, but may be a circular shape, a polygonal shape, or the like.

At a leading end of the leading end tube section 16, the leading end wall portion 27b is provided. For this reason, the head member 23 can be preserved.

In the leading end wall portion 27b, a passing-through opening portion 27c, through which the leading end portion 28 of the head member 23 passes so as to be able to protrude and be withdrawn, is formed. In the illustrated example, the passing-through opening portion 27c is made to be a circular shape that is adapted to the cross-sectional shape of the cylindrical leading end portion 28.

The leading end tube section 16 is movable in an extending direction (a leading end direction) and the opposite direction thereto.

As shown by arrows in FIG. 6, the leading end tube section 16 can turn in a direction around the axis of the leading end tube section 16 with respect to the biasing member 17 and the outer tube body 18. For this reason, the leading end tube section 16 can also turn in a direction around the axis of the leading end tube section 16 with respect to the housing body 11. Therefore, when gripping the housing body 11 and then inserting the cleaning tool 1 of this embodiment into the connector receiving hole 72 (refer to FIG. 20) of the optical adapter 70, the leading end tube section 16 turns in a direction around the axis thereof, thereby being able to take a position corresponding to the shape of the connector receiving hole 72.

As shown in FIG. 6, as the biasing member 17, a spring member such as a coil spring is suitable.

A rear portion of the biasing member 17 is inserted into the connection tube portion 96, whereby a rear end portion of the biasing member 17 can come into contact with the step portion (not shown). On the other hand, a front end portion of the biasing member 17 can come into contact with a rear end portion of the large diameter portion 19 of the leading end tube section 16.

The outer tube body 18 is formed into an approximately cylindrical shape, thereby being made such that the connection tube portion 96 and the large diameter portion 19 can be inserted therein.

In FIGS. 1 and 2, a reference numeral 102 denotes a guide member which is mounted on the leading end portion of the leading end tube section 16 of the extension tube body 21. The guide member 102 is connected to the front plate portion 12c through a string-like body 103 made of elastically deformable resin, for example.

Next, one example of a method of using the cleaning tool 1 of this embodiment will be described.

Figure 15A:
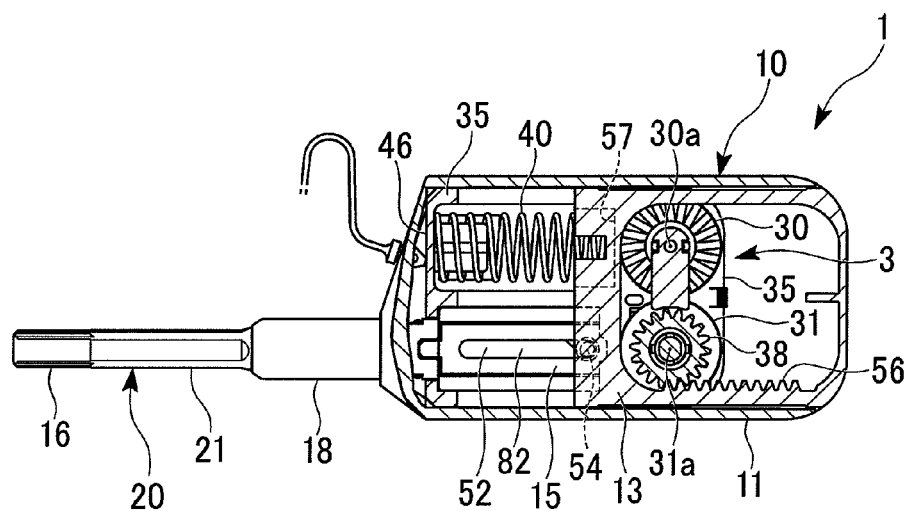
FIG. 15A is a process diagram showing an operation of the feeding mechanism and a cross-sectional view showing a normal state.

In a normal state shown in FIG. 15A, the housing body 11 is located relatively at the rear relatively with respect to the extension section 20 and the feeding mechanism 3.

Also, since the biasing member 17 biases forward the leading end tube section 16 by taking a reaction force of the connection tube portion 96, the leading end tube section 16 is relatively located relatively at the front and the head member 23 is housed in the leading end tube section 16, as shown in FIG. 16.

Figure 12:
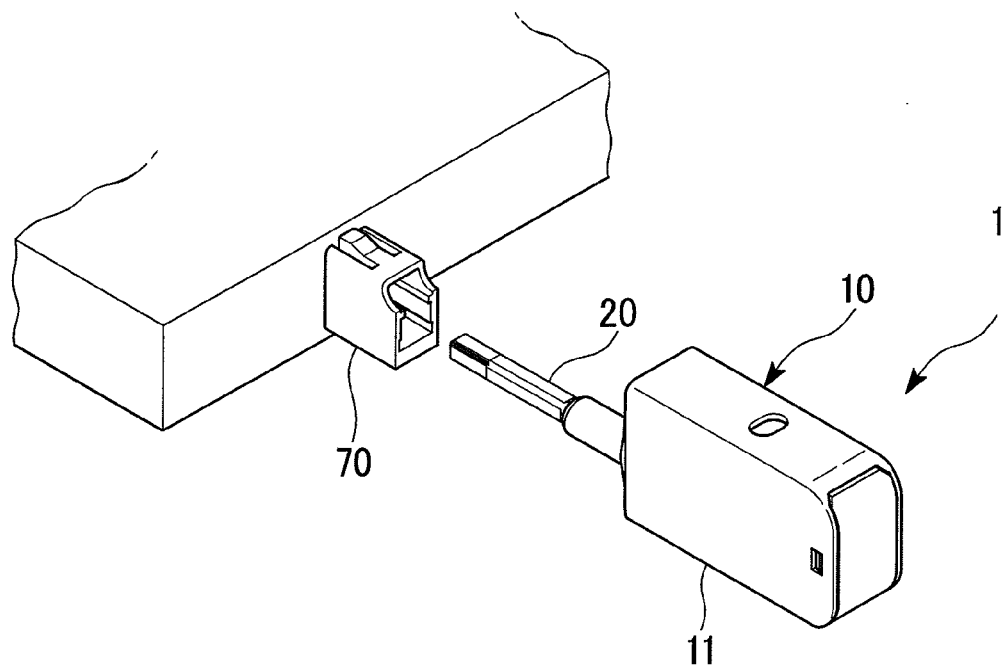
FIG. 12 is a process diagram showing a method of using the optical connector cleaning tool.
Figure 13:
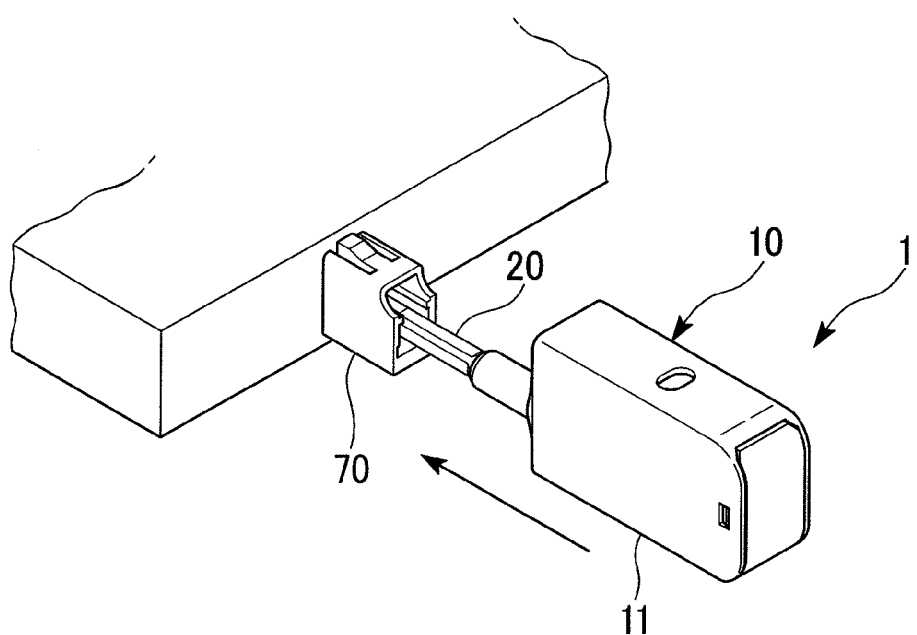
FIG. 13 is a process diagram following the previous drawing.

As shown in FIGS. 12, 13, and 20, if a worker grips the housing body 11 with the fingers or the like and inserts the leading end tube section 16 of the extension section 20 from a connector insertion opening 71 of the optical adapter 70, the leading end tube section 16 enters the connector receiving hole 72 while being positioned by an inner wall 70a of the optical adapter 70.

Figure 14:
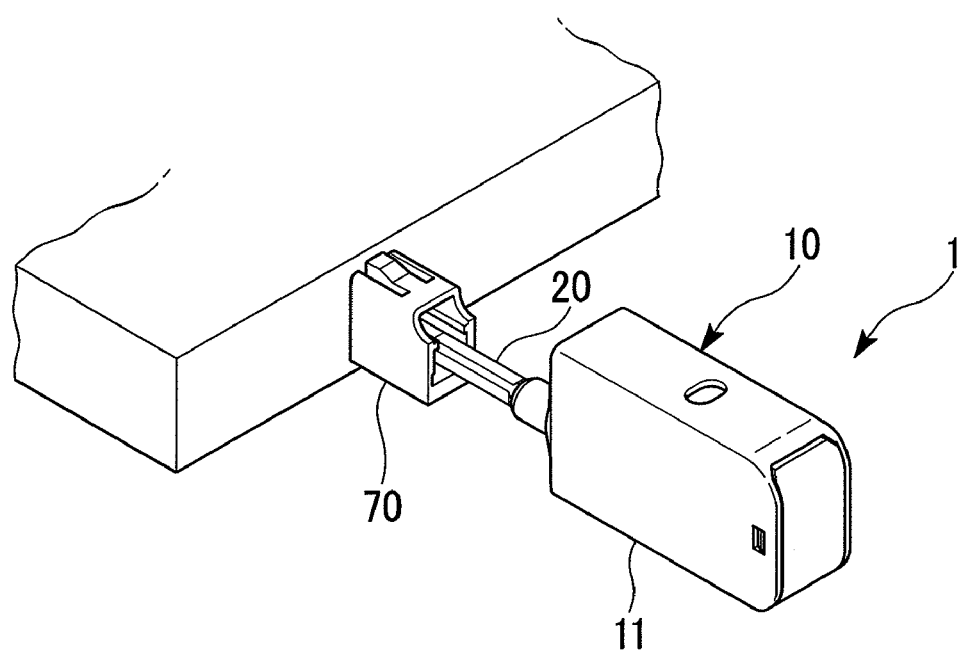
FIG. 14 is a process diagram following the previous drawing.

As shown in FIGS. 14 and 20, if the housing body 11 is moved forward, since the leading end of the leading end tube section 16 receives a reaction force from a wall portion 70b or the like of the optical adapter 70, the rotating shaft 52 and the head member 23 move forward relatively with respect to the leading end tube section 16.

Figure 15B:
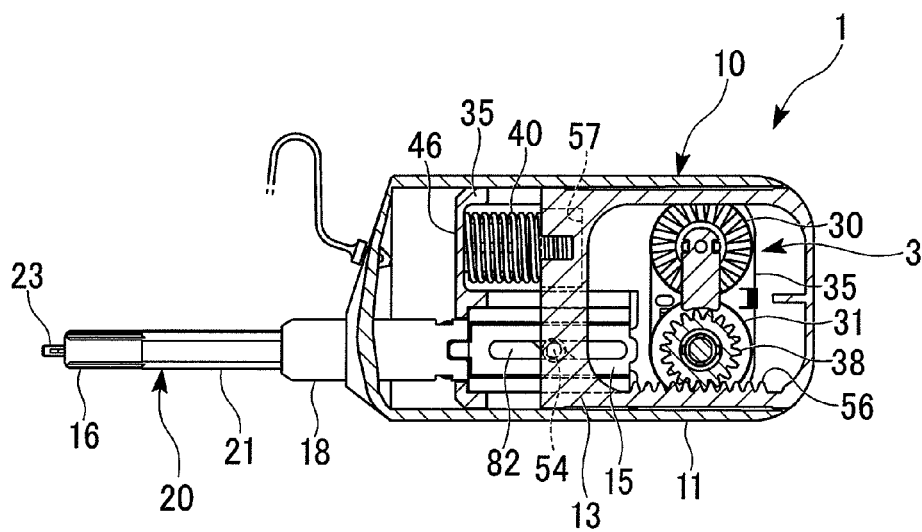
FIG. 15B is a process diagram showing an operation of the feeding mechanism and a cross-sectional view showing a state where a housing body has moved forward.
Figure 17:
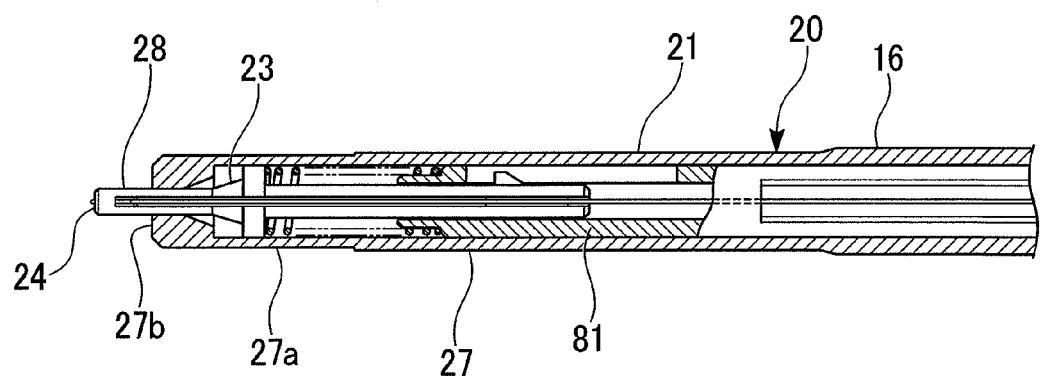
FIG. 17 is a process diagram following the previous drawing.

Accordingly, as shown in FIGS. 15B and 17, the leading end portion 28 of the head member 23 protrudes from the leading end of the leading end tube section 16, whereby the pressing face 24 is exposed.

As shown in FIG. 20, the cleaning body 2 on the pressing face 24 comes into contact with an appropriate position (here, an optical fiber hole 61b and the periphery thereof) of the joining end face 61a of an optical plug 60.

As shown in FIG. 15B, if a further forward force is applied to the housing body 11, the housing body 11 moves forward relatively with respect to the extension section 20 which receives the reaction force in the optical adapter 70.

As shown in FIG. 11, at this time, since the tube body base 15 of the extension tube body 21 is housed in the tube body base housing portion 36 in a state where backward movement has been regulated by the regulation plates 42A and 42B, the position in the front-and-back direction of the feeding mechanism 3 does not change greatly before and after application of a force. For this reason, a state is created where the biasing member 40 is compressed by the pressing body 13, thereby biasing backward the pressing body 13 by taking a reaction force of the supporting body 35.

Figure 18:
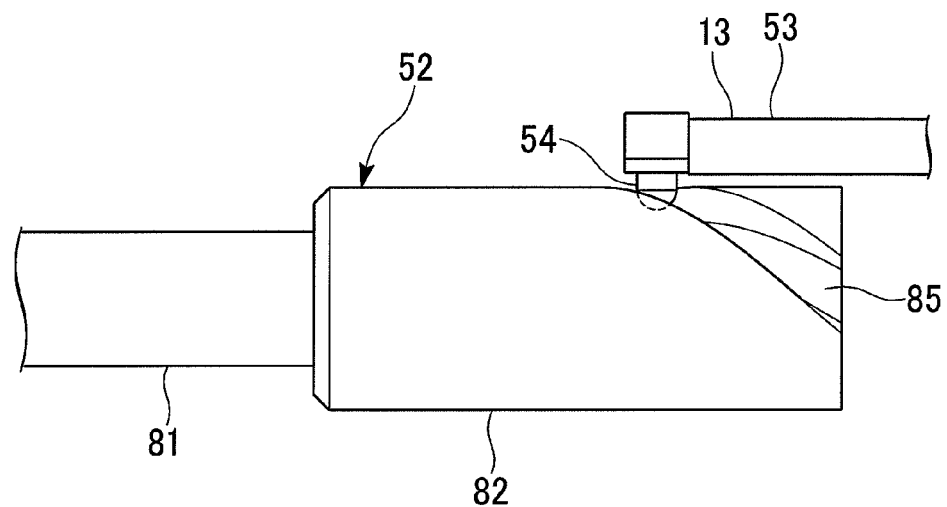
FIG. 18 is a process diagram showing an operation of the rotating shaft.
Figure 19:
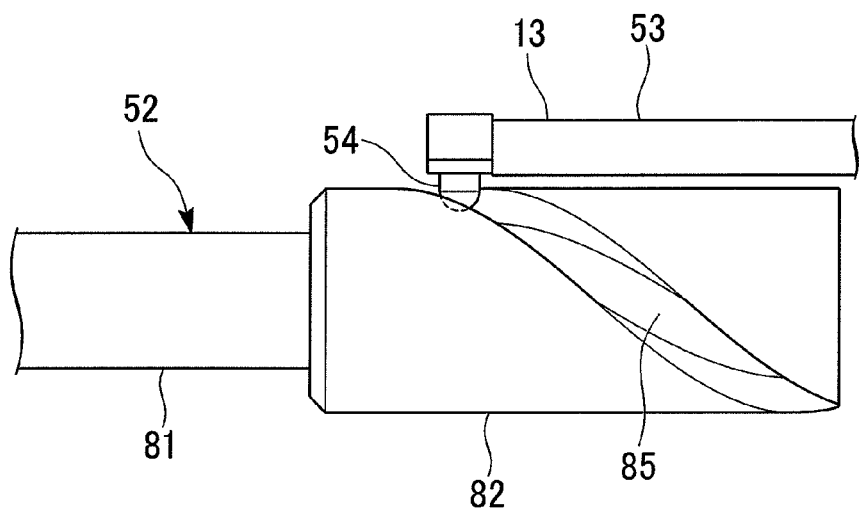
FIG. 19 is a process diagram following the previous drawing.

As shown in FIG. 15B, since the pressing body 13 of the housing body 11 moves forward relative with respect to the rotating tube portion 82, the insertion protrusion portion 54 also moves forward in a state where it has been inserted into the cam groove 85 of the rotating tube portion 82, as shown in FIGS. 18 and 19. For this reason, the rotating shaft 52 rotates around the axis thereof.

As shown in FIG. 20, since the head member 23 rotates around the axis thereof by the rotation of the rotating shaft 52, the cleaning body 2 rotates around the axis of the head member 23 in a state where the cleaning body 2 comes into contact with the joining end face 61a, so that the joining end face 61a is wiped away and cleaned.

As shown in FIGS. 11 and 15B, since the pressing body 13 moves relatively with respect to the feeding mechanism 3, a force in a rotation direction is imparted to the toothed wheel portion 88 of the gear 38 by the gear receiving portion 56. The winding reel 31 also rotates with the rotation of the gear 38. For this reason, the cleaning body 2 is wound.

According to this, the cleaning body 2 is drawn from the supply reel 30 and fed and moved through the pressing face 24 of the head member 23.

By the feeding movement of the cleaning body 2, contamination such as dirt, dust, or oil, which is attached to the joining end face 61a, is reliably wiped away.

When withdrawing the extension section 20 from the optical adapter 70, a worker moves the housing body 11 backward.

The positions in the front-and-back direction of the extension tube body 21 and the feeding mechanism 3 with respect to the housing body 11 are returned to a normal state (the state shown in FIG. 15A) by the elastic force of the biasing member 40. Also, the rotating shaft 52 and the head member 23 move backward relatively with respect to the leading end tube section 16 due to the elastic force of the biasing member 17 (refer to FIGS. 15A and 16), whereby the head member 23 is housed in the leading end tube section 16.

In the cleaning tool 1 of this embodiment, since the installation position of the biasing member 40 is closer to the front than the installation positions of the supply reel 30 and the winding reel 31, it is not necessary to secure a space for the biasing member 40 behind the feeding mechanism 3, such that the size in the front-and-back direction (the length size) of the cleaning tool 1 can be reduced.

Therefore, it is possible to easily perform cleaning work even in a case where a sufficient working space cannot be secured.

Also, since a direction in which the central axes 30a and 31a of the supply reel 30 and the winding reel 31 are arranged is the Y direction different from the extending direction (the X direction) of the extension section 20, a space in the front-and-back direction in the housing body 11 for housing the supply reel 30 and the winding reel 31 can be reduced.

For this reason, the size in the front-and-back direction (the length size) of the cleaning tool 1 can be reduced.

Therefore, it is possible to more easily perform cleaning work.

Next, a cleaning tool 101 according to a second embodiment of the present invention will be described with reference to the drawings. In the following explanation, with respect to a portion common to the cleaning tool 1 of the first embodiment, the same reference numeral is applied and explanation thereof is omitted or simplified.

As shown in FIGS. 21 to 23B, the cleaning tool 101 is different from the cleaning tool 1 in that the position in the width direction (the Y direction) of the extension section 20 is at the center in the width direction of the housing body 11.

Figure 23A:
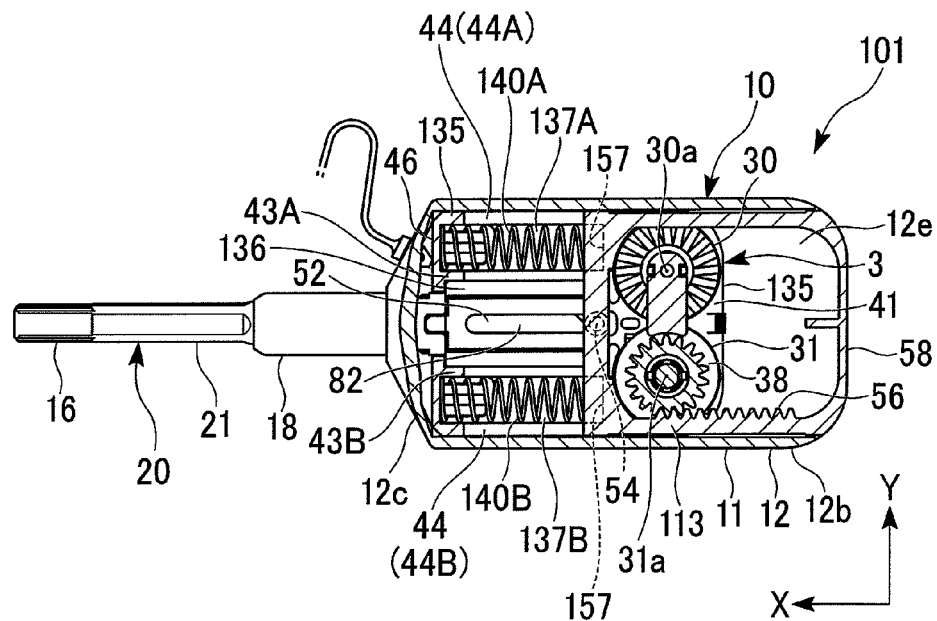
FIG. 23A is a process diagram showing an operation of the feeding mechanism and a cross-sectional view showing a normal state.

As shown in FIG. 23A, a supporting body 135 of the feeding mechanism 3 includes the basal plate 41, the supply reel support shaft 32, the winding reel support shaft 33, the side plates 44 (44A and 44B) formed at both side edge portions of the basal plate 41, two partition plates 43A and 43B provided between both side plates 44 (44A and 44B), and the front end plate 46.

The partition plates 43A and 43B are formed being spaced from each other in the width direction (the Y direction) at the middle position between both side plates 44 (44A and 44B) and approximately parallel to both side plates 44 (44A and 44B). These partition plates 43A and 43B partition a space between both side plates 44 (44A and 44B) into a tube body base housing portion 136 and biasing member housing portions 137A and 137B.

The tube body base housing portion 136 is a space between the partition plates 43A and 43B and can house the tube body base 15 of the extension tube body 21.

The biasing member housing portion 137A is a space between the side plate 44A on one side and the partition plate 43A and can house a first biasing member 140A.

The biasing member housing portion 137B is a space between the side plate 44B on the other side and the partition plate 43 and can house a second biasing member 140A.

At a pressing body 113, pressing portions 157 each having the same configuration as the above-mentioned pressing portion 57 are provided at positions equivalent to the biasing member housing portions 137A and 137B.

Figure 23B:
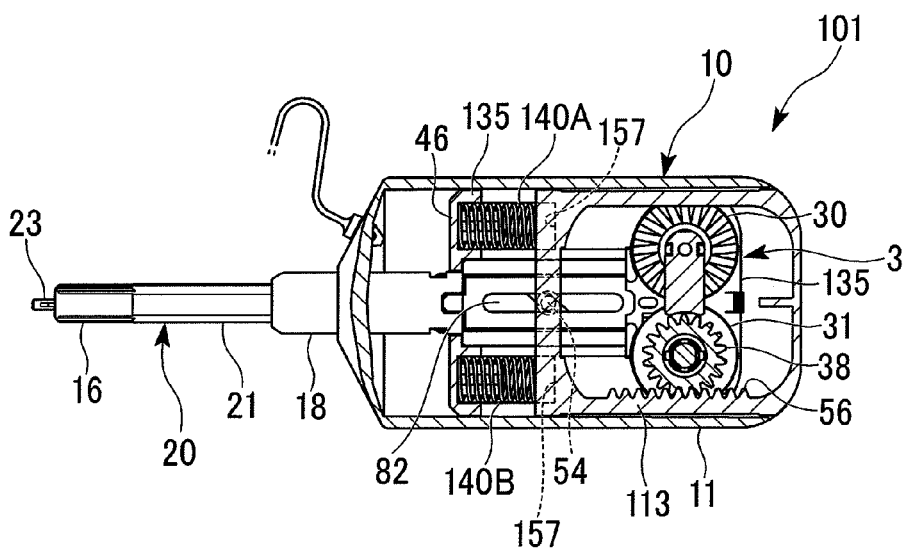
FIG. 23B is a process diagram showing an operation of the feeding mechanism and a cross-sectional view showing a state where the housing body has moved forward.

As shown in FIG. 23B, the biasing members 140A and 140B bias the housing body 11 backward by taking a reaction force of the supporting body 135, in a state where the housing body 11 has moved forward. Specifically, the biasing members 140A and 140B bias backward the pressing portions 157 of the pressing body 13 by taking a reaction force of the front end plate 46.

The positions of the support shafts 32 and 33 are set such that the position of the supply reel 30 is close to one side in the width direction compared to the extension section 20 and the position of the winding reel 31 is close to the other side in the width direction compared to the extension section 20.

In an example shown in FIG. 23A, the position of the central axis 30a of the supply reel 30 is closer to one side in the width direction than the position of the central axis line of the extension tube body 21 and the position of the central axis 31a of the winding reel 31 is closer to the other side in the width direction than the position of the central axis line of the extension tube body 21.

That is, the position in the width direction of the central axis line of the extension tube body 21 is between the position of the central axis 30a of the supply reel 30 and the position of the central axis 31a of the winding reel 31.

According to this configuration, it is possible to smoothly perform both supply and take-up of the cleaning body 2 with respect to the insertion hole 83 of the rotating shaft 52.

Also, since pressing forces by the biasing member 140A and 140B are applied evenly in the width direction to the supporting body 135, it is possible to attain stabilization of an operation when moving the housing body 11 with respect to the feeding mechanism 3.

In the illustrated example, two biasing members 140A and 140B are provided and the positions in the width direction of these biasing members are respectively close to one side and the other side in the width direction compared to the extension section 20. However, the number of biasing members is not limited thereto, and may be three or more.

Even in this case, a configuration is preferable in which the position in the width direction of at least one of these biasing members is close to one side in the width direction compared to the extension section 20 and the position in the width direction of at least one of the other biasing members is close to the other side in the width direction compared to the extension section 20.

The present invention can be applied to various types of optical fiber connectors and can be applied to, for example, single fiber optical connectors such as a LC type optical connector (trademark of Alcatel-Lucent Japan Ltd.), a SC type optical connector (SC: Single fiber Coupling optical fiber connector) which is established in JIS C 5973, a MU type optical connector (MU: Miniature-Unit coupling optical fiber connector) which is established in JIS C 5983, and a SC2 type optical connector. The SC2 type optical connector is one in which a knob that is mounted outside a housing is omitted from the type optical connector.

Although in the illustrated example, the optical adapter 70 and the optical plug 60 are set to be targets, a target of the cleaning tool of the present invention is not limited thereto. For example, a configuration can also be adopted in which an optical connector receptacle (specifically, a receptacle housing) is made to function as a positioning housing for a connector.

In this case, a ferrule incorporated into a sleeve-shaped receptacle housing functions as the optical connector related to the present invention. A joining end face of the ferrule can be cleaned by inserting an insertion section (the extension section) of the cleaning tool into a connector receiving hole that is an inside space of the receptacle housing.

According to the optical connector cleaning tool of the present invention, the length size thereof can be reduced, so that it is possible to easily perform cleaning work even in a case where a sufficient working space cannot be secured.

What is claimed is:

1. An optical connector cleaning tool that wipes away and cleans a joining end face of an optical connector by a cleaning body that is fed and moved, the optical connector cleaning tool comprising:
    a tool main body; and
    an extension section that extends from the tool main body,
    wherein the tool main body includes a feeding mechanism that performs supply and take-up of the cleaning body, a rotating mechanism that rotates and moves the cleaning body contacting with the joining end face, a housing body that houses both the feeding mechanism and the rotating mechanism, and a biasing member that is located in the housing body and biases the housing body,
    wherein the extension section includes an extension tube body that extends from the housing body, and a head member that presses the cleaning body against the joining end face at a leading end of the extension tube body,
    wherein the feeding mechanism includes a supply reel that supplies the cleaning body to the head member, a winding reel that takes up the cleaning body passed through the head member, and a supporting body that rotatably supports the supply and winding reels,
    wherein the housing body is relatively movable forward and backward in an extending direction of the extension section with respect to the extension section and the feeding mechanism and includes a driving section that feeds and moves the cleaning body by rotationally driving the winding reel in a take-up direction by the forward movement of the housing,
    wherein the rotating mechanism including a rotating shaft holding the head member,
    wherein the rotating shaft rotates around the axis thereof by a cam mechanism by the forward movement of the housing and rotates and moves the cleaning body by rotating the head member around the axis thereof,
    wherein the biasing member biases backward in the extending direction the housing body that is in a state where the housing body has relatively moved forward in the extending direction,
    wherein a position in a front-and-back direction of the biasing member is closer to the extension section compared to positions in a front-and-back direction of the supply reel and the winding reel,
    wherein the housing body includes a case section and a pressing body that is located in the case section and positioned with respect to the case section,
    wherein the pressing body has a pressing portion, with which one end portion of the biasing member comes into contact,
    wherein the biasing member biases backward the housing body that is in a state where the housing body has relatively moved forward in the extending direction by biasing backward the pressing portion by taking a reaction force of the supporting body, and
    wherein the extension section has a length that defines a longitudinal axis, and the biasing member is offset from the longitudinal axis.

2. The optical connector cleaning tool according to claim 1, wherein two or more of the biasing members are provided, wherein a position in a width direction perpendicular to the extending direction of at least one biasing member of these biasing members is close to one side in the width direction compared to the extension section, and wherein a position in a width direction of at least one of the other biasing members is close to the other side in the width direction compared to the extension section.

3. The optical connector cleaning tool according to claim 2, wherein a direction in which a central axis of the supply reel and a central axis of the winding reel are arranged is a direction different from the extending direction.

4. The optical connector cleaning tool according to claim 3, wherein a direction in which the central axis of the supply reel and the central axis of the winding reel are arranged is perpendicular or approximately perpendicular to the extending direction.

5. The optical connector cleaning tool according to claim 4, wherein any one of the supply reel and the winding reel is located at a rear in the extending direction of the extension section.

6. The optical connector cleaning tool according to claim 5, wherein a position in a width direction perpendicular to the extending direction of the supply reel is close to one side in the width direction compared to the extension section, and wherein a position in a width direction of the winding reel is close to the other side in the width direction compared to the extension section.

7. The optical connector cleaning tool according to claim 3, wherein any one of the supply reel and the winding reel is located at a rear in the extending direction of the extension section.

8. The optical connector cleaning tool according to claim 4, wherein a position in a width direction perpendicular to the extending direction of the supply reel is close to one side in the width direction compared to the extension section, and wherein a position in a width direction of the winding reel is close to the other side in the width direction compared to the extension section.

9. The optical connector cleaning tool according to claim 7, wherein a position in a width direction perpendicular to the extending direction of the supply reel is close to one side in the width direction compared to the extension section, and wherein a position in a width direction of the winding reel is close to the other side in the width direction compared to the extension section.

10. The optical connector cleaning tool according to claim 1, wherein a direction in which a central axis of the supply reel and a central axis of the winding reel are arranged is a direction different from the extending direction.

11. The optical connector cleaning tool according to claim 10, wherein a direction in which the central axis of the supply reel and the central axis of the winding reel are arranged is perpendicular or approximately perpendicular to the extending direction.

12. The optical connector cleaning tool according to claim 11,
    wherein a position in a width direction perpendicular to the extending direction of the supply reel is close to one side in the width direction compared to the extension section, and
    wherein a position in a width direction of the winding reel is close to the other side in the width direction compared to the extension section.

13. The optical connector cleaning tool according to claim 11, wherein any one of the supply reel and the winding reel is located at a rear in the extending direction of the extension section.

14. The optical connector cleaning tool according to claim 13,
    wherein a position in a width direction perpendicular to the extending direction of the supply reel is close to one side in the width direction compared to the extension section, and
    wherein a position in a width direction of the winding reel is close to the other side in the width direction compared to the extension section.

15. The optical connector cleaning tool according to claim 10, wherein any one of the supply reel and the winding reel is located at a rear in the extending direction of the extension section.

16. The optical connector cleaning tool according to claim 15,
    wherein a position in a width direction perpendicular to the extending direction of the supply reel is close to one side in the width direction compared to the extension section, and
    wherein a position in a width direction of the winding reel is close to the other side in the width direction compared to the extension section.

* * * * *